United States Patent
Jones et al.

[15] 3,679,748
[45] July 25, 1972

[54] 2-AMINOMETHYL-1,3-BUTADIENE MONOMERS

[72] Inventors: Giffin D. Jones; Gerald R. Geyer, both of Midland, Mich.; Melvin J. Hatch, Socorro, N. Mex.

[73] Assignee: The Dow Chemical Company, Midland, Mich.

[22] Filed: Sept. 3, 1970

[21] Appl. No.: 69,442

Related U.S. Application Data

[60] Continuation-in-part of Ser. No. 798,512, Oct. 23, 1968, Pat. No. 3,544,532, which is a division of Ser. No. 381,546, July 9, 1964, abandoned.

[52] U.S. Cl. ............... 260/583 H, 260/80.3 N, 260/82.1, 260/88.1 P, 260/584 R, 260/585 A, 210/54, 162/169
[51] Int. Cl. .................................................. C07c 87/24
[58] Field of Search .......................... 260/583 H, 584 R

[56] References Cited

UNITED STATES PATENTS 2,136,177  11/1938  Carothers et al. ............... 260/583 H

*Primary Examiner*—Joseph Rebold
*Assistant Examiner*—Richard L. Raymond
*Attorney*—Griswold and Brudick and D. B. Kellom

[57] ABSTRACT

New cationic 2-aminomethyl-1,3-butadiene monomers of Formula I:

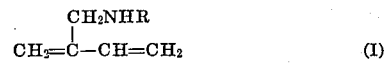

are prepared by reacting 2-halomethyl-1,3-butadiene with ammonia or an organic amine $NH_2R$ (II). These aminomethyl monomers can be polymerized to form cationic polymers and copolymers. They are particularly suitable for modifying styrene-maleic anhydride copolymers to form vinyl resins with increased toughness desirable for coatings, adhesives, laminates, foams, potting resins, and fiber-reinforced panels.

5 Claims, No Drawings

2-AMINOMETHYL-1,3-BUTADIENE MONOMERS

This application is a continuation-in-part of application Ser. No. 798,512 filed Oct. 23, 1968, now U.S. Pat. No. 3,544,532 which in turn is a division of application Ser. No. 381,546 filed July 9, 1964, now abandoned.

Mannich and Salzman [Ber., 72 506 (1939)] describe the synthesis of 1-dimethylamino-2-(dimethylaminomethyl)butanol-3 and a process for its conversion in low yield to the tertiary amine 2-dimethylaminomethyl-1,3-butadiene. However, this process is not applicable to the synthesis of primary and secondary 2-aminomethyl-1,3-butadiene monomers.

Carothers et al. U.S. Pat. No. 2,073,363 discloses the preparation of 4-amino-1,2-butadiene by reaction of 4-chloro-1,2-butadiene with liquid ammonia at room temperature.

Rubens U.S. Pat. No. 3,297,787 describes the modification of copolymers of unsaturated dicarboxylic acid anhydrides and vinyl compounds by incorporation of a primary vinyl amine such as vinylbenzyl amine, vinylphenethyl amine and allyl amine. By addition of 0.1–1.0 mole of a vinyl amine per mole of anhydride in the copolymer, a more resilient, less brittle polymer is obtained with a toughness particularly desirable for castings, coatings, adhesives, etc.

STATEMENT OF THE INVENTION

2-Aminomethyl-1,3-butadiene monomers of Formula I:

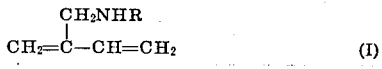

where R is H, $C_1$–$C_{16}$ alkyl, or $C_2$–$C_4$ hydroxyalkyl, are prepared by reaction of 2-chloromethyl- or 2-bromomethyl-1,3-butadiene with ammonia or a primary alkyl amine.

These primary and secondary amino monomers are particularly effective as a modifier of copolymers of unsaturated dicarboxylic acid anhydrides and vinyl compounds as described by Rubens U.S. Pat. No. 3,297,787.

These monomers can be polymerized alone or with other polymerizable ethylenically unsaturated monomers by neutralization and thereafter polymerization, preferably in the presence of a vinyl polymerization catalyst such as a peroxide. The presence of the aminomethyl groups in the resulting polymers increases the hydrophilic properties of the polymer. By appropriate choice of the comonomer, soluble polymers with varied chemical and physical properties desired for flocculants or epoxy resin curing agents can be obtained. The water-soluble cationic polymers are particularly useful as wet-strength additives for paper. Cured rubbers can be obtained by reaction of the 2-aminomethyl-1,3-butadiene copolymers with diisocyanates.

The presence of residual unsaturation in the polymer provides ready sites for subsequent modification of the polymer. For example, the cationic polymer applied as a paper coating can be further polymerized or cross-linked to decrease the water sensitivity of the coating. Ion-exchange resins are prepared by further cross-linking.

GENERAL DESCRIPTION - MONOMERS

2-Chloromethyl-1,3-butadiene is conveniently prepared by the chlorination of isoprene as described by Berenbaum U.S. Pat. No. 2,937,125. The crude product containing cis- and trans-1-chloro-2-methyl-1,3-butadiene in addition to 2-chloromethyl-1,3-butadiene can be purified by fractional distillation. Although 2-chloromethyl-1,3-butadiene is preferred for the synthesis of the aminomethyl monomers, 2-bromomethyl-1,3-butadiene also can be used.

2-Aminomethyl-1,3-butadiene (I, R  H) is prepared by reaction of 2-chloromethyl-1,3-butadiene with liquid ammonia under the general conditions described by Carothers et al. U.S. Pat. No. 2,073,363. After complete amination, the excess liquid ammonia is removed, conveniently by distillation, and the liquid 2-aminomethyl-1,3-butadiene is separated from the by-product ammonium halide and purified preferably by vacuum distillation.

Amination with a primary alkyl amine ($RNH_2$) yields secondary alkylaminomethyl-1,3-butadiene monomers of Formula I:

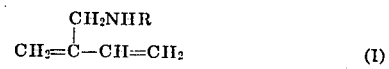

where R is a $C_1$–$C_{16}$ alkyl group. Lower $C_1$–$C_4$ alkyl amines and particularly $C_2$–$C_4$ hydroxyalkyl amines are desirable to achieve maximum water-solubility. Representative of the variety of primary amines which can be used are methyl amine, isopropyl amine, dodecyl amine, 2-aminoethanol, and isopropanol amine.

In practice, amination is conveniently achieved by adding an aqueous solution of the desired primary amine to an alcoholic solution of 2-chloromethyl-1,3-butadiene. Alternately the reaction can be carried out in an anhydrous polar solvent such as methanol or a liquid solvent in which both the chloromethylbutadiene and primary amine are soluble such as toluene or methylene chloride. Usually excess amine is used to minimize cross-linking and achieve high yields of the 2-aminomethyl monomer by reaction between about 0° to 60°C, preferably about 20°–50°C for about 0.2–4 hours.

When an aqueous solution of amine is employed, the soluble cationic monomer is usually dissolved in the aqueous phase. Often this aqueous solution can be directly used. However, when necessary, the amino monomer can be isolated by removal of the solvent, by precipitation as an insoluble salt, or by other conventional means.

POLYMERS

By virtue of the 1,3-diene structure, the 2-aminomethyl monomers described herein are susceptible to polymerization alone or with other polymerizable ethylenically unsaturated monomers. The polymers range from viscous liquids to white solids depending in part on molecular weight. The composition of copolymers can be varied widely. The amount of cationic aminomethyl monomer required to modify the properties of a copolymer is often small. Indeed, these cationic 1,3-butadiene monomers are particularly effectively employed in minor proportions ranging from about 0.5 to 20 mole percent based on total monomer to incorporate a moderate number of functional cationic groups in a copolymer.

Homopolymers of I have the major repeating unit $-CH-C(CH_2NHR) = CH-CH_2-$ and are typically a pale yellow to orange viscous liquid or gel. In the salt form, they are easily soluble in water, water-methanol mixtures, water-acetone mixtures, and the like. In the free amine form, they are soluble in chlorinated solvents, such as chloroform, lower alkanols, such as methanol, ethanol, isopropanol and butanol, and other like compounds and mixtures thereof. The molecular weight varies from low molecular weight oligomers containing less than about 10 monomer units up to about 500,000 or more depending on polymerization conditions, such as time, temperature etc.

The homopolymers in salt form are flocculants and in the free amino form are epoxy curing agents. The oligomers are preferred for the latter use.

The 2-aminomethyl-1,3-butadienes can also be copolymerized with other ethylenically unsaturated monomers to obtain copolymers consisting essentially of an aliphatic hydrocarbon backbone bearing a plurality of aminomethyl groups and containing sites of ethylenic unsaturation. These copolymers contain as an essential element a plurality of groups of Formula II:

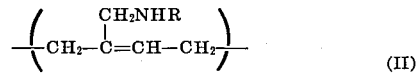

The copolymer may also contain other substituent groups including hydroxyl, carboxyl, ester, amido; hydrocarbyl such as alkyl, aryl, alkaryl, aralkyl, cycloaliphatic; and halo-, hydroxy-, or amino-substituted hydrocarbyl groups.

Typical ethylenically unsaturated comonomers include: (a) vinyl aromatic compounds, such as styrene, halo-substituted styrenes, e.g., 4-chlorostyrenes, 2,4-dichlorostyrene, alkyl-substituted styrenes, e.g., methyl-styrene and 4-t-butylstyrene, divinylbenzene, and other vinyl aromatic monomers having typically from eight to about 12 carbon atoms; (b) acrylic acids, esters, amides, and salts such as acrylic acid, methacrylic acid, acrylamide, methacrylamide, alkyl acrylates (e.g., methyl, ethyl, propyl, butyl and dodecyl acrylate and methacrylate), sulfoethyl methacrylate, alkali metal acrylates and methacrylates (e.g., sodium or potassium acrylate and methacrylate), and the like; (c) polymerizable alkenes and haloalkenes such as 1,4-butadiene, isoprene, 2-hydroxymethyl-1,3-butadiene; chloroprene, 2-chloromethyl-1,3-butadiene, vinylidene chloride; and (d) vinyl ketones such as methyl vinyl ketone and methyl isopropenyl ketone and the like.

The resulting copolymers contain functional aminomethyl plus other substituent groups of the co-monomers. The molecular weight of these polymers range from a few hundred to a million or more, but typically lie between about 1,000 and about 500,000 depending upon the specific monomer and polymerization conditions.

The water-soluble copolymers are useful as flocculants while the water-insoluble or substantially water-insoluble copolymers are useful as epoxy curing agents and cure-rate accelerators in vulcanizable rubber compositions. In addition, the copolymers, like the homopolymers, can be cross-linked by reaction of the amino groups with a cross-linking agent such as ethylene dichloride, 1,4-dichlorobutene-2, diglycidyl ether of bisphenol A, or toluenediisocyanate; and the like, or a cross-linking agent which reacts with sites of ethylenic unsaturation, such as a maleic polyester or similar vinyl ester resin.

POLYMERIZATION PROCESS

These 2-aminomethyl-1,3-butadienes (I) are quite reactive monomers. In the free base form, they inhibit the polymerization of comonomers. However, in the salt form, these monomers can be polymerized and copolymerized. Thus, the polymerization process usually requires a neutral or acidic media and an appropriate aminomethyl salt. Cyclodimerization may be a side reaction; this side reaction is minimized by maintaining the monomer below about 60°C.

Substantially any organic or inorganic acid with a $pK_a$ less than about 6.5 can be used to form the monomer salt. Typical inorganic acids include HCl HBr, $H_3PO_4$, $H_2CO_3$, and $H_2SO_4$. Suitable organic acids are benzoic, p-chlorobenzoic, p-toluenesulfonic acids; acetic, propionic, chloroacetic and formic acids; and similar alkyl and aryl carboxylic, sulfonic phosphoric and phosphonic acids. Advantageously, the acid is selected to increase the compatability of the salt with the reaction medium and/or the comonomer(s). For example, (a) an organic acid, such as benzoic acid, is advantageous if the amino monomer is to be copolymerized with styrene; and (b) HCl is advantageously used if the polymerization of the amino monomer is to occur in aqueous media. In the case of carbonic acid a super pressure of carbon dioxide of at least 15 psig is required.

Polymers and copolymers of I can be prepared in bulk, in solution, or in dispersion using conventional techniques. A solvent is in some instances preferred to insure better or more complete mixing of the monomers. The preferred solvents are methanol and t-butyl alcohol either alone or aqueous. Emulsion polymerization of the monomers is also suitable when the acid, such as benzoic or 2-ethylhexanoic, makes the amino monomer oil soluble.

Polymerization is accelerated by the addition of a vinyl polymerization catalyst such as sodium persulfate, hydrogen peroxide, benzoyl peroxide, tertiary butyl peroxide, $\alpha,\alpha'$-azobisisobutyronitrile, and redox systems such as persulfate-metabisulfite. Usually such catalysts are employed in an amount ranging from about 0.1 to 2 weight percent based on total monomer.

With a suitable catalyst, polymerization is readily achieved at temperatures ranging from about 0° to 200°C, preferably about 20°–60°C. The reaction pressure generally is not critical. However, oxygen is excluded to prevent discoloration of the polymer and chain termination. Also, since free amino groups are chain terminators, other monomers containing amino nitrogen should be converted to the amine salt prior to polymerization.

After polymerization, the polymers may be converted to the free amine form by washing with inorganic base or if the polymer is water soluble in the free base form by treatment with anion exchange resin.

ALTERNATIVE POLYMER SYNTHESIS

An alternate and complementary approach to the synthesis of the 2-aminomethyl polymers containing moieties of the formula:

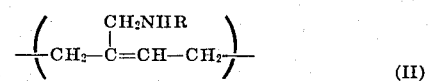

(II)

entails an initial polymerization or copolymerization of 2-chloromethyl-1,3-butadiene and subsequent reaction of a primary amine, $RNH_2$. In some instances, cross-linking may occur during this polymerization process.

The prerequisite intermediate polymer can be prepared from 2-chloromethyl-1,3-butadiene by homopolymerization or copolymerization with an ethylenically unsaturated monomer as described above. While the amount of 2-chloromethyl-1,3-butadiene in the comonomer mixture can be as low as 0.5 mole percent, this approach to the synthesis of cationic polymers is most advantageous when 10–20 mole percent or more of 2-chloromethyl-1,3-butadiene is used. To obtain maximum cationic capacity, a homopolymer of 2-chloromethyl-1,3-butadiene is used.

Polymerization of 2-chloromethyl-1,3-butadiene is achieved by conventional means, preferably in aqueous emulsion. It is accelerated by heat and catalyzed by conventional free radical catalysts such as $\alpha,\alpha$-azobis-isobutyronitrile, potassium persulfate, benzoyl peroxide, and hydrogen peroxide. While optimum polymerization conditions will depend on the particular monomer and catalyst system being used, it is generally beneficial to carry out the polymerization between about 50° and 100°C with a reaction time of from 2 to 50 hours or more to achieve high conversions.

The resulting polymer can be isolated and purified by standard methods. For example, the homopolymer can be precipitated from aqueous emulsion with methanol. The essentially linear polymer is insoluble in water, methanol, and similar polar solvents but easily dissolves in such non-polar solvents as methylene chloride, carbon tetrachloride and toluene. Structural studies indicate that the homopolymer is largely a 1,4-addition polymer i.e., that the predominate structural moiety has the formula

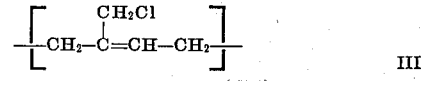

III

However, there is some evidence for minor amounts of 1,2-addition polymerization. As estimated from osmotic pressure measurements, the homo- and copolymer molecular weight can range from about 10,000 to 100,000.

The 2-aminomethyl polymers are then obtained by amination of the 2-chloromethyl-1,3-butadiene polymer with ammonia or a primary alkyl amine as described above. Excess amine (particularly a branched amine) is used to minimize cross-linking. With a water-soluble amine, the aminated polymer is usually obtained as an aqueous solution which can be used for many applications without further processing. When necessary, however, the cationic polymer can be isolated and purified by precipitation with an appropriate diluent, removal of the solvent by neutralization with caustic, and other conventional means.

POLYMER USES

To use the subject polymers as a flocculant, an aqueous solution of the polymer is added to the aqueous suspension under flocculating conditions. The latter connotes an initial rapid and efficient mixing of the polymer to promote uniform distribution throughout the liquid followed by additional gentle agitation to optimize the aggregation of the suspended solids. The suspended particles may be clay or other inorganic and/or organic solids, such as metal values, organic sewage, and the like.

In free amine form, the polymers preferably of lower molecular weight, are effective curing agents and accelerators for epoxy resins, rubbers, etc. When used to cure an epoxy resin, the polymer is generally added in an amount giving an amine/epoxy equivalent ratio of about 1–10. Suitable epoxy resins include epoxy-novolac resins, diglycidyl ethers of bisphenol A and similar resins. The cured resins are useful as potting agents, durable cast articles, and the like. As curing rate accelerators, about 0.1–10 weight percent of the amino polymers are blended into the curable rubber composition by conventional means, and thereafter the rubber mixture is cured. The use of the 2-aminomethyl-1,3-butadiene polymer results in greater resilience and toughness.

Within the general scope of this invention, optimum conditions for a particular monomeric or polymeric product can be determined in a routine manner. Normally these amine products are formed in salt form with a halide counter anion. When desired, the halide anion can be replaced by standard ion exchange techniques, with other common anions such as sulfate, bisulfate, nitrate, hydroxide, carbonate, acetate, etc. By treatment with an appropriate base, the free amino monomers and polymers are obtained.

The following examples illustrate further the present invention. Unless otherwise specified, all parts and percentages are by weight.

EXAMPLE 1 2-AMINOMETHYL-1,3-BUTADIENE

To 48 parts (0.47 mole) of 2-chloromethyl-1,3-butadiene in a pressure vessel cooled below —40°C with liquid nitrogen was added 200 parts (11.8 moles) of anhydrous ammonia. The reactor was sealed and allowed to warm to room temperature with agitation. After stirring for about 12 hours at room temperature, the unreacted liquid ammonia was slowly vented. The residual product-ammonium chloride mixture was extracted with ether and the liquid extract distilled to yield 19.3 parts (49 percent yield) of 2-aminomethyl-1,3-butadiene, b.p. 35°C at 30 mm (I, R = H). Its purity by titration with standard hydrochloric acid was 94 percent. Analysis by nuclear magnetic resonance indicated a purity of 96 percent with 4 percent isoprene. Further confirmation of its structure and purity was obtained from infrared and mass spectra.

EXAMPLE 2 2-(2-HYDROXYETHYLAMINOMETHYL)-1,3-BUTADIENE

A. To 290 parts (4.75 moles) ethanol amine containing 0.5 pt. of diphenylphenylenediamine as a polymerization inhibitor and cooled to 0°C was added with stirring in 1.5 hour 102.5 pts. (1.0 mole) 2-chloromethyl-1,3-butadiene. The mixture was warmed to room temperature while stirring another 4 hours. By chloride analysis, the reaction was then 97.5 percent complete.

The reactants were diluted with 1,500 pts. water and extracted with methyl isobutyl ketone. The ketone extract was concentrated at 30°C/20 mm Hg to give 92 parts of a dark liquid residue. Fractional distillation gave 43 pts of 2-(2-hydroxyethylaminomethyl)-1,3-butadiene, b.p. 83°–5°/3 mm Hg (I, R = $HOC_2H_4$-). This product assayed 99.7 percent by HCl titration and contained no impurities detectable by NMR analysis.

B. In a similar manner isopropanolamine was reacted with 2-chloromethyl-1,3-butadiene to yield liquid 2-(2-hydroxypropylaminomethyl)-1,3-butadiene (I, R = $HOC_3H_6$-).

EXAMPLE 3 POLYMERS OF I

A. 17.14 Pts. of 2-aminomethyl-1,3-butadiene and 0.17 pt. azobisisobutyronitrile (AIBN) were charged into a glass ampule and 20.6 pts. of concentrated HCl added slowly with stirring. To remove entrained gases, the acidic solution was frozen and thawed several times under reduced pressure before sealing the ampule. Heating at 50°C for 26 hours gave a pale yellow homopolymer as a rubbery, elastic, but water-soluble gel. A portion was dissolved in water and converted to the free amine form by passing through an anion-exchange resin column in hydroxide form.

B. A mixture of 5 pts. 2-aminomethyl-1,3-butadiene, 0.05 pt. AIBN, 0.025 pt. mercaptoethanol, and 60 pts concentrated HCl was purged with nitrogen and then heated at about 50°C for 41.5 hours to give a yellow, very viscous, water-soluble polymer.

C. A mixture of 5 pts. 2-aminomethyl-1,3-butadiene, 0.07 pt. AIBN, 0.31 pt. mercaptoethanol, 0.14 pt. of 5 percent aqueous sodium ethylenediaminetetraacetate and 5 pts. methanol was adjusted to pH 6 with benzoic acid. Then 2.025 pt. isoprene and 1 pt. methanol were added. The solution was frozen and evacuated to remove oxygen. Then it was heated at 50°C for 81.5 hours to yield a pale yellow, water-soluble copolymer containing about 70 percent aminomethyl monomer.

D. A sample of 2-(2-hydroxyethylamino)methyl-1,3-butadiene polymerized when exposed to 500 kilorads/hr. gamma irradiation for 16 hours. The polymer readily dissolved in aqueous acid.

E. Poly(2-chloromethyl-1,3-butadiene) was prepared in aqueous emulsion by vigorously agitating a mixture of 260 parts of 80 percent 2-chloromethyl-1,3-butadiene, 0.12 part of tert.-dodecylmercaptan, and an aqueous solution of 1.4 parts of sodium lauryl sulfate, 0.3 part of potassium persulfate and 0.3 part of sodium bicarbonate in 140 parts of water. Polymerization was achieved by heating the emulsion at about 50°C for 40 hours. Then the polymer was precipitated by pouring the emulsion into an excess of methanol with vigorous agitation. The finely divided, white product was recovered by filtration, washed with methanol and then air dried.

The poly(2-chloromethyl-1,3-butadiene) was insoluble in water and methanol, but dissolved in methylene chloride, toluene and tetrahydrofuran. It contained 30.3 wt. percent side chain chlorine as determined by reaction with excess trimethylamine and 31.5 wt. percent total chlorine by elemental analysis. The higher total chlorine content indicates copolymerization of some 1-chloro-2-methyl-1,3-butadiene. The polymer had an average molecular weight of 35,000 as determined by the membrane osmotic pressure of a tetrahydrofuran solution. Spectral studies indicate that the polymer has predominately the 1,4-addition structure.

By reaction of the poly(2-chloromethyl-1,3-butadiene) with excess liquid ammonia essentially as described in Example 1, a cross-linked poly(2-aminomethyl-1,3-butadiene) can be obtained.

EXAMPLE 4 UTILITY OF AMINOMETHYL POLYMERS

A. The flocculant activity of the poly(2-aminomethyl-1,3-butadiene), P(AMB), of Example 3A was tested with a 5 percent (by volume) aqueous slurry of montmorillonite clay. To 50 ml of the slurry in a graduated cylinder was added 0.05 ml of a 7.3 percent aqueous solution of the polymer. The polymer and slurry mixture was blended by inverting the graduate 3 times and then observing the settling rate of the treated slurry. Results are given in Table 1.

TABLE 1

Flocculant Test

| Test | | Sec. 0 | Settling rate, Inches per second | | | | | |
|---|---|---|---|---|---|---|---|---|
| | | | 5 | 15 | 30 | 45 | 70 | 90 |
| 1-1 | Control | Inches 0 | — | — | — | — | — | 0.5 |
| 1-2 | P(AMB) | Inches 0 | 0.5 | 1.0 | 2.0 | 2.5 | 3.0 | — |

The control overhead was very cloudy while that of the sample treated with poly (AMB) was very clear.

B. A diphenyl ether epoxide containing about 2.5 epoxy groups per diphenyl ether, prepared by the process of Hatch U.S. Pat. No. 3,455,967, was cured at room temperature by mixing about 4–10 equivalents of poly (AMB) per equivalent of epoxide giving a flexible cross-linked resin. With the lower ratio of poly (AMB) a brittle resin was produced. Similar results were obtained using as a curing agent the 2/1 copolymer of 2-aminomethyl-1,3-butadiene and isoprene described in Example 3C.

C. Modified Styrene-Maleic Anhydride Polymer

To distinguish the primary and secondary 2-aminomethyl-1,3-butadienes from the known tertiary 2-dimethylaminomethyl-1,3-butadiene, comparative tests of these amines as modifiers of an o-chlorostyrene-styrene/maleic anhydride casting resin were made following the general procedure of Rubens U.S. Pat. No. 3,297,787.

1. An o-chlorostyrene-styrene/maleic anhydride casting resin solution was prepared as described by Rubens by dissolving 400 pts. of a low molecular weight styrene/maleic anhydride copolymer (5.89 percent maleic anhydride, intrinsic viscosity of 1.26) in 600 pts. of o-chlorostyrene. The solution had viscosity of about 733 cps at 25°C.

2a. To 50 pts. of the o-chlorostyrene solution was added 0.5 pt. of 2-aminomethyl-1,3-butadiene (0.5 mole/mole maleic anhydride) and the mixture held overnight at room temperature. Then 1% benzoyl peroxide was added and the resin composition transferred to a casting mold. After polymerization and curing at 80°C for 2 hours and then at 120°C for 1 hour, a tough, flexible and resilient casting was obtained. Its flexural strength was about 9,420 psi, a 10 fold increase over that of the unmodified resin. Its Izod impact was 1.2 compared with 0.2 for the unmodified resin.

2b. Similarly 2 pts. of 2-(2-hydroxyethylaminomethyl)-1,3-butadiene was dissolved in 100 pts. of a 40 percent solution of a styrene/maleic anhydride copolymer (5.0 percent maleic anhydride) and the mixture polymerized by heating at 80°C for 18 hours and then at 120°C for 1 hour. The 0.110 inch cast polymer was clear with a flex strength of 5,120 psi, a flex modulus of $3.31 \times 10^5$ psi and a flat impact of 0.3 inch pounds. A control casting without the added aminomethyl monomer was too brittle to test.

2c. 2-Dimethylaminomethyl-1,3-butadiene was prepared from dimethylamine and 2-chloromethyl-1,3-butadiene following the procedure of Example 1. Its purity was greater than 91 percent by NMR analysis.

A solution containing 0.5 pt. of 2-dimethylaminomethyl-1,3-butadiene in 50 parts of the o-chlorostyrene-styrene/maleic anhydride resin solution described in (1) was prepared. To three samples of the solution was added 0.1, 0.5, and 1.0 percent benzoyl peroxide. The color of the solutions darkened in proportion to the amount of peroxide catalyst. However, after heating for 2 hours at 80°C and for more than 48 hours at 120°C the mixtures remained essentially unchanged with little evidence of the desired polymerization.

The failure of the 2-dimethylamino-1,3-butadiene as a casting resin modifier in contrast to the utility of the 2-aminomethyl-1,3-butadiene clearly establishes a novel property of the primary and secondary 2-aminomethyl-1,3-butadienes (I) distinct from the tertiary 2-dimethylamino-1,3-butadiene.

We claim:

1. A 2-aminomethyl-1,3-butadiene of formula:

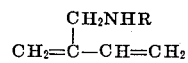

where R is H, $C_1$–$C_{16}$ alkyl, or $C_2$–$C_4$ hydroxyalkyl.

2. 2-Aminomethyl-1,3-butadiene.
3. 2-(2-Hydroxyethylaminomethyl)-1,3-butadiene.
4. 2-(2-Hydroxypropylaminomethyl)-1,3-butadiene.
5. The 2-aminomethyl-1,3-butadiene of claim 1 where R is $C_1$–$C_4$ alkyl.

* * * * *